US007937428B2

(12) United States Patent
Beyer et al.

(10) Patent No.: US 7,937,428 B2
(45) Date of Patent: May 3, 2011

(54) SYSTEM AND METHOD FOR GENERATING AND USING A DYNAMIC BLOOM FILTER

(75) Inventors: Kevin Scott Beyer, San Jose, CA (US); Sridhar Rajagopalan, Salford (GB); Adriana Zubiri, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 11/614,844

(22) Filed: Dec. 21, 2006

(65) Prior Publication Data
US 2008/0154852 A1    Jun. 26, 2008

(51) Int. Cl.
*G06F 17/10* (2006.01)
(52) U.S. Cl. ...................................................... 708/300
(58) Field of Classification Search .................. None
See application file for complete search history.

(56) References Cited

U.S. PATENT DOCUMENTS

| | | |
|---|---|---|
| 2003/0026268 A1 | 2/2003 | Navas |
| 2003/0208665 A1 | 11/2003 | Peir et al. |
| 2005/0033803 A1 | 2/2005 | Vleet et al. |
| 2005/0086520 A1* | 4/2005 | Dharmapurikar et al. .... 713/201 |
| 2005/0108368 A1 | 5/2005 | Mohan et al. |
| 2005/0219929 A1 | 10/2005 | Navas |
| 2008/0155229 A1* | 6/2008 | Beyer et al. ................... 711/216 |
| 2008/0243800 A1* | 10/2008 | Beyer et al. ........................ 707/3 |
| 2008/0243941 A1* | 10/2008 | Beyer et al. ................... 707/200 |

OTHER PUBLICATIONS

Using Bloom Filters by Maciej Ceglowski dated Apr. 8, 2004—O'REILLY PERL.COM The Source for Perl.
Michael Mizenmacher, "Compressed Bloom Filters", Harvard University, IEEE/ACM Transactions on Networking, vol. 10, No. 5, Oct. 2002.
Patrick Reynolds and Amin Vahdat, "Efficient Peer-To-Peer Keyword Searching", Dept of Computer Science, Duke University, 2003.
Purushottam Kulkarni, Prashant Shenoy, "Scalable Techniques for Memory-Efficient CDN Simulations", Dept of Computer Science, Univeristy of Massachusetts, May 20-24, 2003.

* cited by examiner

*Primary Examiner* — David H Malzahn
(74) *Attorney, Agent, or Firm* — Marc D. McSwain; Shimokaji & Associates, P.C.

(57) ABSTRACT

A dynamic Bloom filter comprises a cascaded set of Bloom filters. The system estimates or guesses a cardinality of input items, selects a number of hash functions based on the desired false positive rate, and allocates memory for an initial Bloom filter based on the estimated cardinality and desired false positive rate. The system inserts items into the initial Bloom filter and counts the bits set as they are inserted. If the number of bits set in the current Bloom filter reaches a predetermined target, the system declares the current Bloom filter full. The system recursively generates additional Bloom filters as needed for items remaining after the initial Bloom filter is filled; items are checked to eliminate duplicates. Each of the set of Bloom filters is individually queried to identify a positive or negative in response to a query. When the system is configured such that the false positive rate of each successive Bloom filter is decreased by one half, the system guarantees a false positive rate of at most twice the desired false positive rate.

1 Claim, 4 Drawing Sheets

SYSTEM AND METHOD FOR GENERATING AND USING A DYNAMIC BLOOM FILTER

CROSS-REFERENCE TO RELATED APPLICATION

The present application relates to co-pending application titled "System And Method For Generating A Cache-Aware Bloom Filter," Ser. No. 11/614,790 which is filed concurrently herewith, and which is incorporated herein by reference in its entirety.

FIELD OF THE INVENTION

The present invention generally relates to data structures and in particular to Bloom filters. More specifically, the present invention relates to a Bloom filter that allocates memory as needed while guaranteeing a false positive rate.

BACKGROUND OF THE INVENTION

A Bloom filter is a space-efficient probabilistic data structure used to test whether an element is a member of a set. This member test can yield false positives but not false negatives. The more elements that are added to the set contained in the Bloom filter, the larger the probability of false positives. Bloom filters have a strong space advantage over other data structures, such as self-balancing search trees, tries, hash tables, or simple arrays or linked lists of the entries.

A Bloom filter is an approximate encoding of a set of items or keys using a bit vector of b bits. During encoding, the item is hashed to a number between 1 to b and the corresponding bit in the bit vector is set. To check if an item is a member of the set, the item is hashed and the status of the bit is checked. If the bit is not set, then the item is definitely not in the set. If the bit is set, then either the item is in the set or the hash value of this item collided with the hash value of some other item that is in the set. Because of hash collisions, a Bloom filter can produce false positives (the item is reported as in the set, but it is not), but it never produces false negatives (the item is in the set, but not reported).

Conventional approaches improve the effectiveness of a Bloom filter by hashing each item several times with independent hash functions. For example, k hashes are used. To encode an item x, the k bits in the bit vector that correspond to $h_i(x)$ for $1 \leq i \leq k$ are set. (The same bit may be picked any number of times). To check if item y is a member of the set, item y is hashed k times using the same hash functions. The bit corresponding to $h_i(x)$ is examined to determine whether it is set for all $1 \leq i \leq k$. If any of the k bits are not set, then y cannot be a member of the set; otherwise, all k bits are set and item y is either in the set or a false positive.

Conventional Bloom filters have control points comprising the number of items in the input (n), the amount of memory (b), the number of hash functions (k), and the probability of a false positive (i.e., the false positive rate or fpr). Fixing the size of the input allows the choice of two of the other control point parameters. Memory and the number of hash functions are related. If the number of hashes is fixed and memory is increased, the false positive rate continually decreases. However, if the memory is fixed and the number of hash functions is increased, the false positive rate exhibits a minimum when an expected density (i.e., the percentage of bits set to 1) for the conventional Bloom filter is approximately 50%.

Although conventional Bloom filter technology has proven to be useful, it would be desirable to present additional improvements. A conventional Bloom filter is built and then populated with a set of items or keys. To build a conventional Bloom filter, a user has to know approximately how many keys will populate the conventional Bloom filter to know how much memory to allocate to the conventional Bloom filter. However, in many applications the number of keys is not known prior to building the conventional Bloom filter. Consequently, a user is forced to overestimate the number of keys anticipated for the conventional Bloom filter, leading to inefficient use of memory. Furthermore, inefficient use of memory may lead to a false positive rate that is less than optimum.

Conventional Bloom filters require an accurate estimate of the cardinality of the initial input set. The cardinality is the number of distinct values for a multi-set. The size of the initial input, along with the false-positive rate, determines the amount of memory allocated to encode the set. If the cardinality estimate is wrong, the false positive rate can be much higher than expected.

For example, a conventional Bloom filter may have a target false positive rate of 1/256 for an optimal 8 hashes and a target filter density of 50%. If the actual cardinality is as little as 2 times that of the cardinality estimate, the false positive rate can be 25 times what was expected. If the actual cardinality is 4 times the cardinality estimate, the false positive rate jumps to 150 times the expected value. In this case, over half of the negative results are returned as false positives and the Bloom filter is not particularly useful.

What is therefore needed is a system, a computer program product, and an associated method for generating and using a dynamic Bloom filter that self-sizes as more keys are entered in the Bloom filter. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for generating and using a dynamic Bloom filter.

The present system estimates a cardinality of a set of input items based on an allowable false positive rate, allocates memory for an initial Bloom filter and selects a number of hash functions based on the estimated cardinality. The present system inserts items from the set of input items into the initial Bloom filter and counts the items set in the initial Bloom filter as the items are inserted. If a number of items set in the initial Bloom filter has reached a predetermined target, declaring the initial Bloom filter full.

If there exists a remaining portion comprising additional items in the set of input items that remain for insertion into the dynamic Bloom filter, the present system allocates memory for a next Bloom filter based on an estimated cardinality of the remaining portion or a predetermined memory growth technique. The present system inserts non-duplicate items in the next Bloom filter and counts the bits changed from 0 to 1 as the items are inserted in the next Bloom filter, wherein the non-duplicate items are not duplicates of the items previously inserted in the initial Bloom filter.

If a number of items set in the next Bloom filter has reached a predetermined target, the present system declares the next Bloom filter full. The present system recursively generates additional Bloom filters until the remaining portion is inserted into any of the next Bloom filter and the additional Bloom filters such that the dynamic Bloom filter comprises the initial Bloom filter and any of the next Bloom filter and the additional Bloom filters and no duplicate items are inserted in the dynamic Bloom filter.

In one embodiment, the system does not search for duplicates in the previous filters. Detecting duplicate input items can reduce the amount of memory consumed because each unique item is encoded in exactly one filter. When duplicates are not detected, an item may be encoded in multiple filters. If the input contains no duplicates the or few duplicates the time spent searching for duplicates can be saved at the expense of an additional memory.

The predetermined target is approximately 50% of the bits in any of the initial Bloom filter, the next Bloom filter, and the additional Bloom filters.

In one embodiment, the predetermined memory growth technique comprises a linear growth technique such that each of the next Bloom filter and the additional Bloom filters are approximately a same size as the initial Bloom filter. In another embodiment, the predetermined memory growth technique comprises an exponential growth technique, such that each of the next Bloom filter and the additional Bloom filters are a predetermined factor larger than a preceding Bloom filter. The predetermined factor is, for example 2.

Counting the items inserted in the initial Bloom filter, the next Bloom filter, and the additional Bloom filters comprises counting bits as the bits are changed from 0 to 1.

Using the dynamic Bloom filter comprises receiving a query for any of the items in the dynamic Bloom filter and selecting any of the initial Bloom filter, the next Bloom filter, or the additional Bloom filters to query. If the query of the selected Bloom filter returns positive, return positive for the query of the dynamic Bloom filter. Otherwise, query each of any remaining of the initial Bloom filter, the next Bloom filter, or the additional Bloom filters to query until a positive is returned, and, if no positive is returned, return a negative for the query of the dynamic Bloom filter.

The last of the initial Bloom filter, the next Bloom filter, and the additional Bloom filters comprises the largest percentage of items in the dynamic Bloom filter and is selected first for querying because the last of the initial Bloom filter, the next Bloom filter, and the additional Bloom filters has the highest probability of containing a queried item. An order for querying the initial Bloom filter, the next Bloom filter, and the additional Bloom filters proceeds last to first, successively querying the initial Bloom filter, the next Bloom filter, and the additional Bloom filters by decreasing size.

In another embodiment, the false positive rate is adjusted. If the false positive rate of each successive Bloom filter is divided in half, then a fixed false positive rate of the set of Bloom filters is guaranteed, regardless of the input set size. As an illustration, if $f_1 = f_{target}/2$ and $f_{i+1} = f_i/2$, then $f_{actual} \leq$ sum $f_i < f_{target}$ is guaranteed. If the false positive rate is kept constant for each filter, then the false positive rate will increase linearly with the number of Bloom filters created.

DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
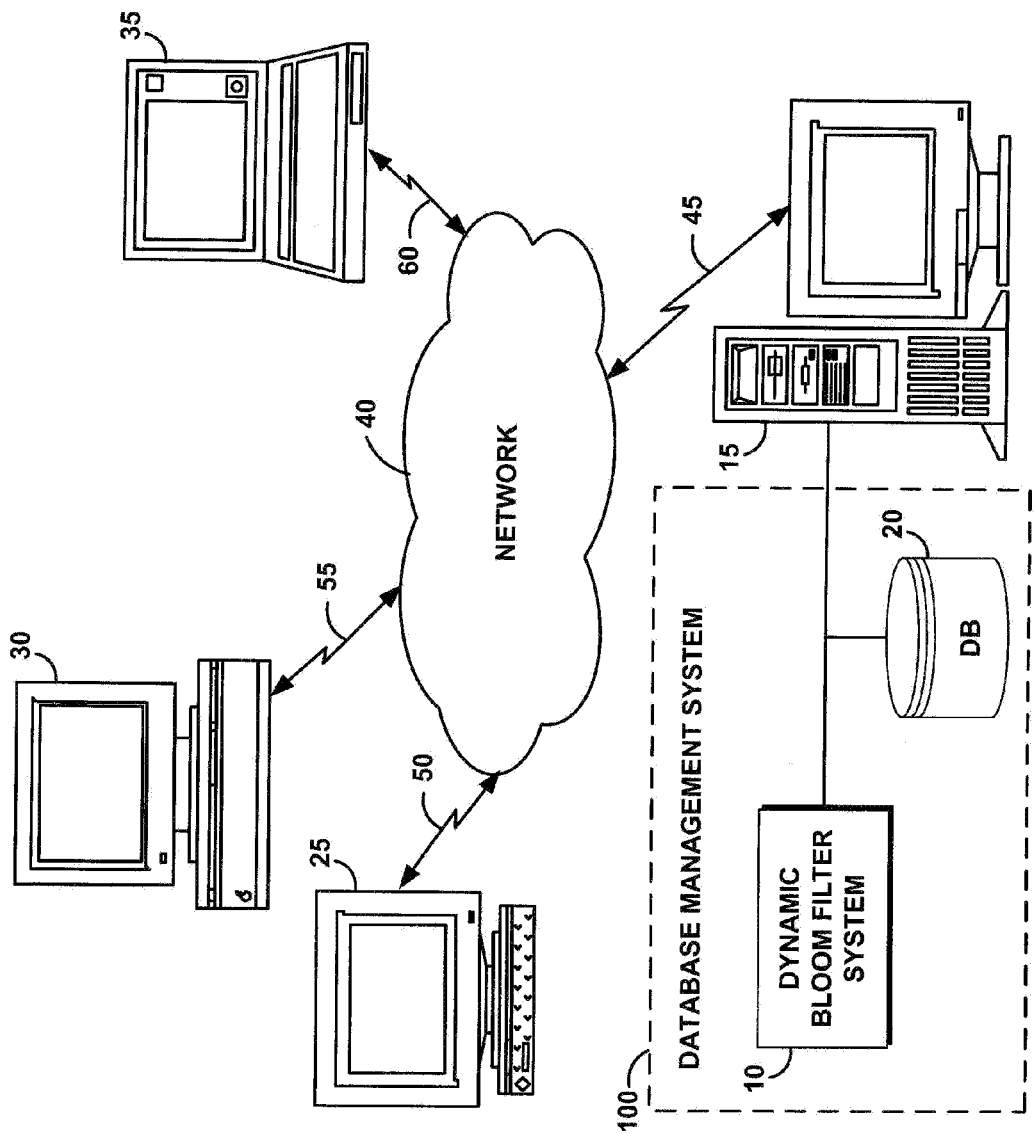
FIG. 1 is a schematic illustration of an exemplary operating environment in which a dynamic Bloom filter system of the present invention can be used.

FIG. 1 portrays an exemplary overall environment in which a system, a computer program product, and an associated method (the dynamic Bloom filter system 10 or the "system 10") for generating and using a dynamic Bloom filter according to the present invention may be used. System 10 comprises a software programming code or a computer program product that is typically embedded within, or installed on a server 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

In an exemplary use of system 10, a database management system 100 comprises a database (dB) 20 and system 10. Users, such as remote Internet users, are represented by a variety of computers such as computers 25, 30, 35, and can access the host server 15 through a network 40. Computers 25, 30, 35, access system 10 to determine whether an element is a member of a set stored in system 10. System 10 returns a negative if the element is not a member of the set. System 10 returns a positive if the element is in the set. System 10 may return a false positive if the element is not in the set. System 10 does not return false negatives. While described in terms of the database management system 100, it should be clear that system 10 is applicable as well to, for example, any implementation in which a Bloom filter may be used.

System 10 provides a guaranteed false positive rate without requiring a fixed estimate for the cardinality of an initial input set. Conventional Bloom filters allocate one filter based upon the input cardinality. System 10 allocates memory as needed. If the initial cardinality estimate is accurate, then system 10 behaves similar to a conventional Bloom filter in terms of memory, requiring only a small additional CPU expense to track usage. When additional memory allocations are used, memory and CPU usage increase compared to a conventional Bloom filter. However, system 10 can guarantee a false positive rate.

For example, assume a set S is encoded in two filters using system 10 with duplicate detection such that the filters encode two disjoint sets $S_1$ and $S_2$. System 10 can encode $S_1$ and $S_2$ using Bloom filters based on the cardinality of each set. The Bloom filter for $S_1$ can use the same hash functions as $S_2$ because $S_1$ and $S_2$ are disjoint; no independence is required. To test whether $x \in S_1 \cup S_2$, system 10 tests both filters: $x \in F(S_1)$ or $x \in F(S_2)$. The false positive rate (denoted fpr) for the combined test of $S_1$ and $S_2$ is as follows (where fp denotes false positive and f is the fpr of each filter):

$$P[fp \text{ from union of } S_1 \text{ and } S_2] = P[fp \text{ from } S_1 \text{ or } S_2]$$
$$= P[fp \text{ from } S_1] + P[fp \text{ from } S_2] -$$
$$P[fp \text{ from } S_1 \text{ and } S_2]$$
$$(\text{inclusion/exclusion})$$
$$= P[fp \text{ from } S_1] + P[fp \text{ from } S_2] -$$
$$P[fp \text{ from } S_1] \cdot P[fp \text{ from } S_2]$$
$$(\text{independence})$$
$$= 2\ddot{A} - \ddot{A}^2$$
$$\approx \dot{Z}2\ddot{A}.$$

Consequently, the false positive rate (fpr) of the union of n sets is at most n times the false positive rate of one Bloom filter.

Figure 2:
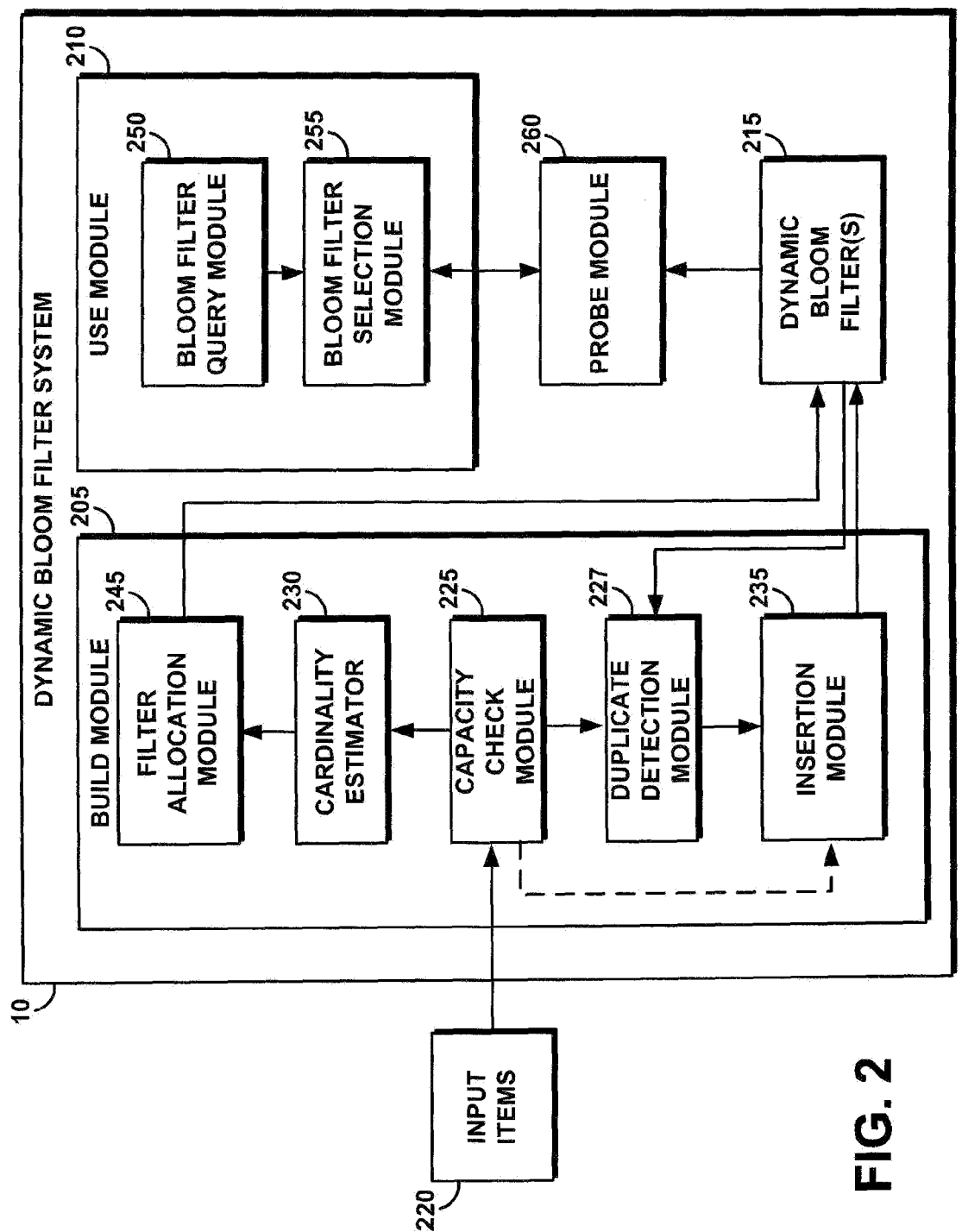
FIG. 2 is a block diagram of the high-level architecture of the dynamic Bloom filter system of FIG. 1.

FIG. 2 illustrates a high-level hierarchy of system 10. System 10 comprises a build module 205 and a use module 210. The build module 205 generates the dynamic Bloom filter 215 and populates the dynamic Bloom filter 215 using input items 220. The dynamic Bloom filter 215 comprises one or more Bloom filters in a cascade. The build module 205 comprises a cardinality estimator 230, a capacity check module 225, a duplicate detection module 227, an insertion module 235, and a filter allocation module 245. The use module 210 provides query access by a user to the dynamic Bloom filter 215. The use module 210 comprises a Bloom filter query module 250 and a Bloom filter selection module 255.

Figure 3:
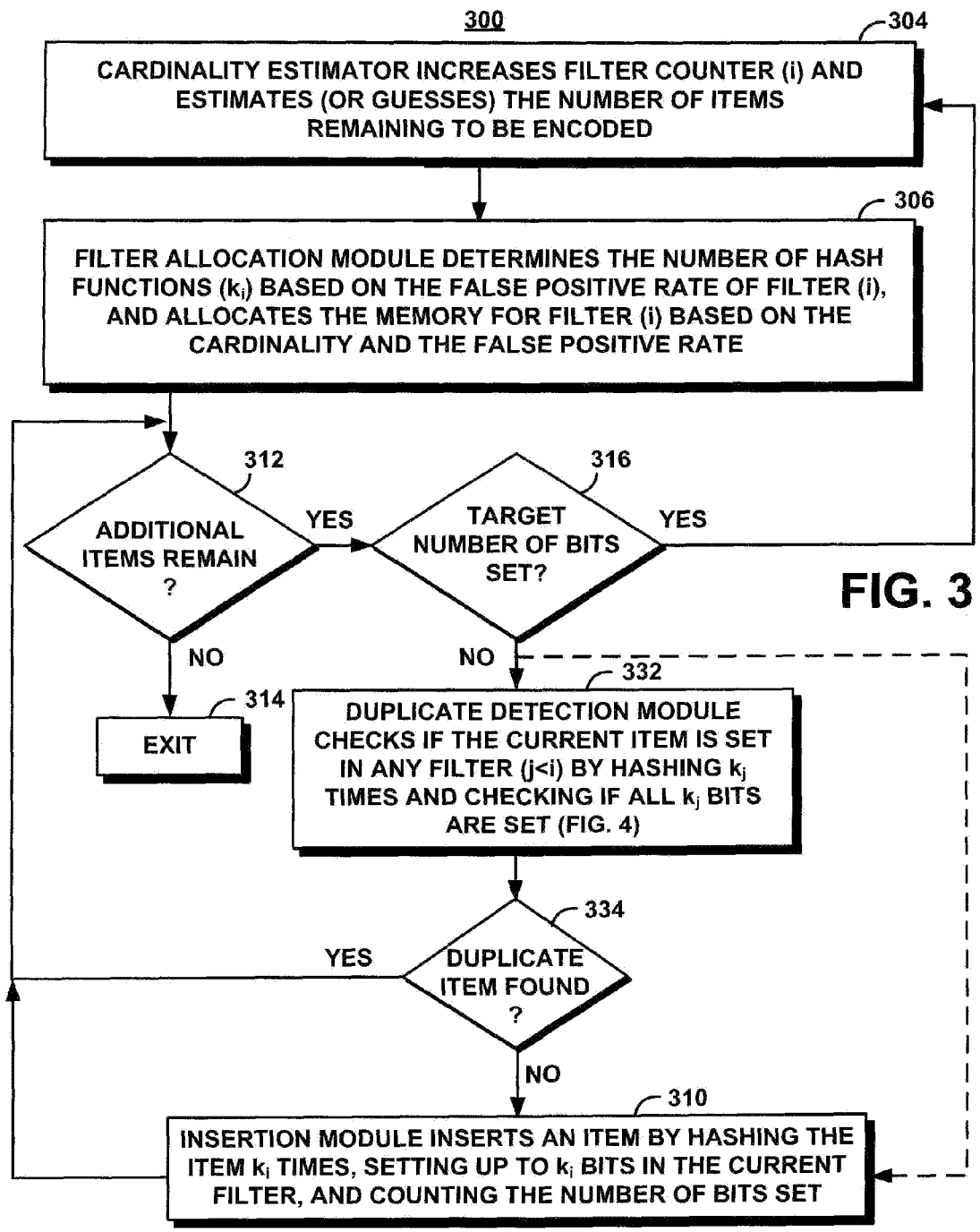
FIG. 3 represents a process flow chart illustrating a method of operation of the dynamic Bloom filter system of FIGS. 1 and 2 in generating a dynamic Bloom filter.

FIG. 3 illustrates a method 300 of the build module 205 of system 10 in generating the dynamic Bloom filter 215. The cardinality estimator 230 increments a Bloom filter counter, i, and estimates or guesses a cardinality, $n_i$, for the input items 220 (step 304). In one embodiment, the allocation module 245 determines a size for the $i^{th}$ Bloom filter using linear growth such that the $i^{th}$ Bloom filter is approximately the same size as the initial Bloom filter. In another embodiment, the allocation module 245 determines a size for the $i^{th}$ Bloom filter using exponential growth such that the $i^{th}$ Bloom filter is some predetermined factor larger than the $(i-1)^{th}$ Bloom filter. Any suitable technique may be used to determine the size of the $i^{th}$ Bloom filter.

The filter allocation module 245 determines a number of hash functions, $k_i$, based on the false positive rate of filter i, $f_i$, and allocates memory for a Bloom filter in the dynamic Bloom filter 215 based on $n_i$ and $f_i$ (step 306):

$$k = lg\left(\frac{1}{\ddot{A}}\right).$$

As used herein, "lg" is interchangeable with "$\log_2$".

The capacity check module 225 determines whether additional items remain to be encoded (step 312). If no items remain, the capacity check module 225 causes the build module 205 to exit (step 314). If an item remains, the capacity check module 225 determines whether the target number of bits are set in the current filter 215 (step 316). For a memory-optimal Bloom filter, the predetermined target number of bits for the initial Bloom filter is approximately 50% of the maximum number of bits (and therefore approximately $n_i$ items have been inserted in the Bloom filter). If the filter is at capacity, the capacity check module 225 returns to step 304. If the filter has room to encode the item (step 316), method 300 proceeds to step 332.

At step 332, the duplicate detection module 227 considers an item from the input set and checks if the item was previously encoded in any prior filter using method 400. If it has already been encoded, then it is returns to step 312 (step 332 and 334). Otherwise, method 300 proceeds to step 310 (step 308).

At step 310, the insertion module 235 inserts the current item in the current Bloom filter 215, and returns to step 312. The same hash codes can be used for all the Bloom filters in the dynamic Bloom filter 215. Consequently, there is no need to hash additional times or use independent hash functions even though two or more Bloom filters are used.

The overall false positive rate for the dynamic Bloom filter 215 comprising n Bloom filters is at most $ng\ddot{A}$. Inclusion/exclusion reduces the false positive rate below $ng\ddot{A}$ because a false positive in more than one filter is counted only once. Furthermore, the $n^{th}$ Bloom filter is typically only partially full and thus has a false positive rate lower than f.

Given sufficient memory and hash functions, the false positive rate of the dynamic Bloom filter 215 can be guaranteed, regardless of the number of filters used. The false positive rate is at most twice the false positive rate for the initial Bloom filter.

If the false positive rate for the initial Bloom filter is f, f/2 for the second filter, f/n for the $n^{th}$ filter, etc:

$$\text{Total } \dot{Z} fpr \leq \sum_{i=1}^{\#Zfilters} \frac{\ddot{A}}{2^i} < 2\ddot{A}$$

This false positive rate for the dynamic Bloom filter 215 is achieved by sizing each successive Bloom filter in the dynamic Bloom filter 215 such that the false positive rate of each Bloom filter, fi, is half the false positive rate of the previous Bloom filter, f(i−1). When using memory-minimal Bloom filters, this constraint translates into one additional hash function and one extra bit set per entry, and a corresponding increase in memory to encode the estimated number of items at this false positive rate.

To guarantee the false positive rate of the dynamic Bloom filter, the false positive rate of each filter is half that of the previous filter. When the false positive rate is decreased, the required number of bits per entry is increased. The number of bits per entry of the filter i is $-\ln(2)*\lg(f_i)$, where $f_i = f_1/2^{i-1}$. Therefore, filter i uses $(1+(i-1)/-\lg(f))$ times more bits per entry than the first filter. Consequently, the relative increase in memory depends upon the original false positive rate, f: the lower the false positive rate, the less significant the increase in memory. For f=1/256, the second filter would use 12.5% more bits per entry than the first filter.

System 10 comprises a technique to encode a set or multi-set of unknown size in a series of Bloom filters in one pass of the input items 220. With only a small overhead, the technique produces the same results as a conventional Bloom filter when the initial cardinality estimate is accurate or over estimated. When the initial cardinality estimate is low, the dynamic Bloom filter 215 responds to the underestimate more gracefully than a conventional Bloom filter. System 10 can choose to pay a linear increase in the false positive rate with each estimation error. Otherwise, system 10 can guarantee the false positive rate using additional memory and hashing.

Figure 4:
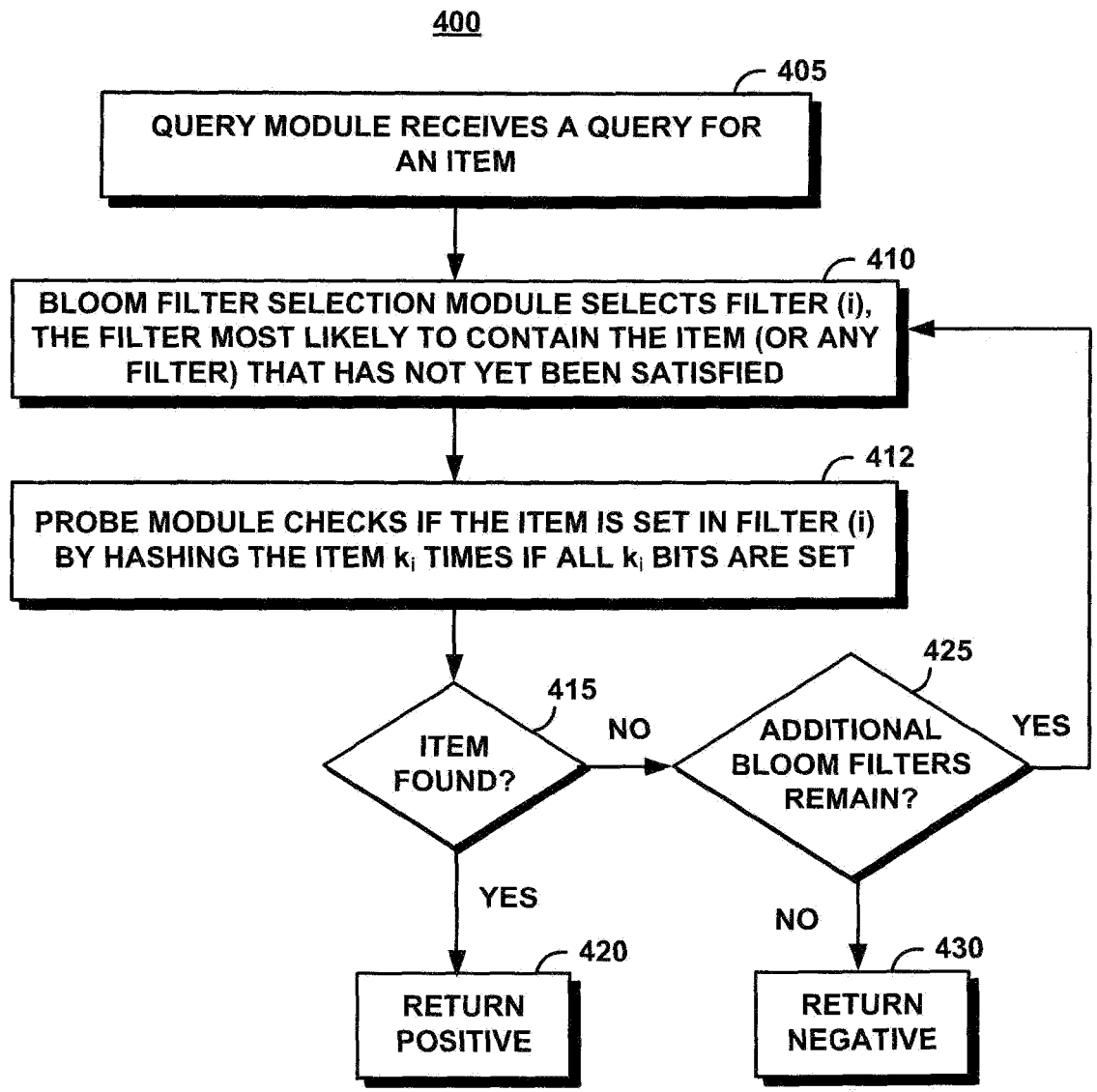
FIG. 4 is a schematic illustration portraying the operation of the dynamic Bloom filter system of FIGS. 1 and 2 in using the dynamic Bloom filter.

FIG. 4 illustrates a method of the use module 210 in using the dynamic Bloom filter 215. The Bloom filter query module 250 receives a query for an item (step 405). The Bloom filter selection module 255 selects any Bloom filter, filter i, in the dynamic Bloom filter 215 to query (step 410) that has not yet been selected. In one embodiment, the Bloom filter selection module 255 selects the Bloom filter that is most likely to contain the query item. In another embodiment, the Bloom filter selection module 225 selects the filter with the most entries encoded in it by the build module 205.

The probe module 260 determines if the query item is found in filter i by hashing $k_j$ times and checking if all $k_j$ bits are set in filter i (step 412). If the item is found at step 415, the use module 210 returns a positive result (i.e., that the item might be in the encoded set) (step 420). Otherwise, the probe module 260 inquires whether additional filters remain to be tested (step 425). If so, method 400 iteratively returns to step 410. Otherwise, method 400 returns a negative result (i.e., the query item is definitely not in the encoded set) (step 430).

It is to be understood that the specific embodiments of the invention that have been described are merely illustrative of certain applications of the principle of the present invention. Numerous modifications may be made to the system and method for generating and using a dynamic Bloom filter described herein without departing from the spirit and scope of the present invention.

What is claimed is:

1. A method of implementing a dynamic Bloom filter comprised of one or more filters, the method comprising:
   generating the dynamic Bloom filter according to the following steps:
      initializing a filter counter to zero;
      setting a filter capacity indicator to a value of true;
      while an input item is available,
         if the filter capacity indicator is true then,
            incrementing the filter counter by one;
            allocating a memory for a current filter based upon a cardinality estimate and a false positive rate;
            determining a number of bits to be set for the input item based upon the false positive rate for the current filter; and
            inserting the input item into the current filter;
         otherwise,
            checking a first selected filter to determine if the input item is contained therein;
            ignoring the input item if the input item is found in the first selected filter;
            inserting the input item into the current filter if the input item was not found in any selected filter; and
            setting the filter capacity indicator to true if the item is inserted in the current filter and current filter is at capacity thereafter; and
   using the dynamic Bloom filter according to the following steps:
      receiving a query for an item;
      applying the query to a second selected filter in the dynamic Bloom filter;
      upon determination that the query of the second selected filter returns a positive a positive result, returning the positive result for the query; and
      returning a negative result for the query of the dynamic Bloom filter if no selected filter returns a positive result.

* * * * *